United States Patent [19]
Buschfeld et al.

[11] Patent Number: 5,681,916
[45] Date of Patent: Oct. 28, 1997

[54] PROCESS FOR PRODUCING UREA-MODIFIED, HIGHLY REACTIVE PHENOLIC RESINS USEFUL AS BONDING AGENTS FOR CENTER-LAYER PARTICLES IN THE MANUFACTURE OF PARTICLEBOARD

[75] Inventors: Adolf Buschfeld; Matthias Lattekamp, both of Alpen; Manfred Gramse; Hans-Jürgen Krezmin, both of Moers, all of Germany

[73] Assignee: RWE-DEA Aktiengesellschaft für Mineraloel und Chemie, Germany

[21] Appl. No.: 464,670

[22] PCT Filed: Dec. 20, 1993

[86] PCT No.: PCT/DE93/01236

§ 371 Date: Jun. 29, 1995

§ 102(e) Date: Jun. 29, 1995

[87] PCT Pub. No.: WO94/15982

PCT Pub. Date: Jul. 21, 1994

[30] Foreign Application Priority Data

Jan. 2, 1993 [DE] Germany .......................... 43 00 035.5

[51] Int. Cl.$^6$ .......................................... C08G 8/04
[52] U.S. Cl. ........................ 528/129; 528/129; 528/141; 528/147; 528/163; 528/164; 524/401
[58] Field of Search ..................... 525/129, 141, 525/147, 163, 164; 524/401

[56] References Cited

U.S. PATENT DOCUMENTS

| 3,903,041 | 9/1975 | Bornstein ................................. 524/14 |
| 4,048,125 | 9/1977 | Ingram, II ............................... 523/223 |
| 4,433,120 | 2/1984 | Chiu ........................................ 525/501 |
| 5,011,886 | 4/1991 | Buschfeld et al. ..................... 524/596 |

FOREIGN PATENT DOCUMENTS

| 0028382 | 5/1981 | European Pat. Off. . |
| 0146881 | 7/1985 | European Pat. Off. . |
| 1189899 | 10/1959 | France . |
| 157909 | 12/1982 | Germany . |

*Primary Examiner*—Samuel A. Acquah
*Attorney, Agent, or Firm*—David L. Mossman

[57] ABSTRACT

Urea-modified, highly reactive phenolic resins useful as center-layer bonding agents in the manufacture of particleboard are provided by condensing phenol and formaldehyde until shortly before gelation takes place such that, after addition of urea, relatively low-alkaline, urea-modified phenolic resins are obtained which my optionally be stored and to which, shortly before processing them into glues for center-layer particles, alkali is added in sufficient quantities to ensure rapid cross-linking of the phenolic resin.

10 Claims, No Drawings

PROCESS FOR PRODUCING UREA-MODIFIED, HIGHLY REACTIVE PHENOLIC RESINS USEFUL AS BONDING AGENTS FOR CENTER-LAYER PARTICLES IN THE MANUFACTURE OF PARTICLEBOARD

This application is a 371 of PCT/DE93/01236 filed Dec. 20, 1993, publisheed as WO94/15982 Jul. 21, 1994.

Phenolic resins have been used for a long time in the wood materials industry for producing relatively weather-resistant particleboard (V-100 quality, DIN 68763). Said resins are aqueous, alkaline-curing phenol-formaldehyde condensates produced by reacting phenol and formaldehyde in the presence of alkalis at a mole ratio of phenol to formaldehyde of 1:1.5 to 3.5, preferably 1:2 to 2.7. The quality of the products is primarily determined by solids content, viscosity, and alkali content.

The higher the molarity of said resins, the better the bonding strength and the shorter the curing time and, consequently, the shorter the pressing time required for making the particleboard. With predetermined solids and alkali contents, the size of the molecules or the degree of condensation is strongly dependent on the viscosity of the resin solution which, however, can only be increased to a limited extent due to the production techniques employed.

To lower the hygroscopicity of phenolic resin-bound particleboard and to prevent decay under the influence of moisture, efforts have been intensified in recent years to lower the alkali content in particleboard by lowering the alkali content in the resins. For instance, it has become customary in the manufacture of particleboard to replace high-alkaline, 45 to 48% phenolic resins containing about 10 to 12% sodium hydroxide by lower-alkaline resins containing 5 to 8% NaOH. However, said resins naturally have lower degrees of condensation and poor bonding strengths due to a high degree of penetration into the wood fiber, and they are less reactive whereby longer pressing times are required.

The phenolic resins described in DE-PS 29 44 178 have a degree of condensation which is maintained at the same high level as that of high-alkaline bonding agents by lowering the solids content with water to 30 to 41% without changing the viscosity. However, as a result of their low solids content, said resins influence the water balance in the particleboard. It is necessary either to dry the particles to a higher degree than usually required, or to extend the pressing times in order that the water evaporates from the particleboard. Therefore, said resins are only useful, if at all, in the outer layers of particleboard.

According to European Patent Application EP 84 115 270.5, high condensation degrees of phenolic resins are achieved by adding to phenol-formaldehyde resins having viscosities of from >300 to 20,000 mPa·s at 20° C., preferably up to 10,000 mPa·s, 2 to 30 wt. % urea, referring to the phenolic resin solution, prior to or after cooling, whereby the viscosity is reduced to a processing viscosity of max. 1,000 mPa·s. With respect to the solids and alkali contents, the reaction of the phenol-formaldehyde resins is controlled such that the solids content of the urea-modified resins is in the range of from 30 to 65% and the alkali content is from 2 to 12 wt. % alkali (as NaOH).

Phenolic resins produced in conformity with EP 84 115 270.5 which have an alkali content of from 2 to 6% and are useful as binders for outer-layer particles have acquired great economic importance in the manufacture of particleboard because they are outstanding by their high bonding strengths and the absence of formaldehyde and, furthermore, by their more reasonable price in comparison with conventional, unmodified outer-layer phenolic resins.

Said resins in accordance with EP 84 115 270.5 which have alkali contents of 2 to 6 wt. % are unsuitable as bonding agents for center-layer particles because their alkalinity is not high enough to ensure rapid curing with the customary short pressing times and the temperatures of as low as 100 to 110° C. occurring in the center layers of particleboard during pressing.

The modified phenolic resins containing 6 to 12% alkali which can be produced by the process described in European patent EP 84 115 270.5 do have a higher degree of condensation than conventional center-layer phenolic resins, but this does not result in significantly shorter pressing times with sufficient bonding strength because, due to the higher alkalinity resulting in a stronger Cannizzaro reaction, methylol groups and formaldehyde are converted into methanol and formate and, consequently, are not available to bind the particle. In addition, said high-alkaline resins may give off ammonia during storage, especially during pressing, thus being an odor nuisance and polluting the environment.

The reactivities of center-layer resins produced according to EP 84 115 270.5 are insufficient to achieve considerably shorter pressing times than those of state-of-the-art processes.

It is the object of the instant invention to provide the particleboard industry with center-layer phenolic resins which do not have the shortcomings described hereinabove and which result in pressing times that are comparable to or even shorter than those required by acid-curing amino resins. It is thus possible to save energy and to increase the capacity of the plant.

According to the instant invention, the problem is solved by condensing phenol and formalin under alkaline conditions such, that after addition of 30 to 50 wt. % of urea, referring to the phenol-formaldehyde condensation product, modified phenolic resins are obtained which contain 50 to 70% of solid matter, preferably 55 to 65%, and 2 to 8 wt. % of alkali (as NaOH), preferably 4 to 7 wt. %, and which have viscosities of max. 5,000 mPa·s at 20° C., preferably 100 to 1,500 mPa·s at 20° C., particularly 200 to 1,000 mPa·s at 20° C., and adding, before processing, a sufficient amount of alkaline solution to said urea-modified, highly reactive, relatively low-alkaline phenolic resins in order to obtain a total alkali content of 7 to 13 wt. % (as NaOH), preferably 8 to 12 wt. %, in the resin solution and to ensure that the phenolic resin on the particle undergoes sufficiently rapid cross-linking.

According to the process of the instant invention, the phenol-formaldehyde resins are condensed until shortly before gelation takes place, namely preferably until the viscosity is greater than 3,000 mPa·s at 20° C., particularly 5,000 to 300,000 mPa·s at 20° C. Urea is then added to the resultant highly-viscous phenolic resin solutions which may optionally be stored prior to use. It is only shortly before processing that an additional quantity of alkali is added to said urea-modified resin in order to ensure that the phenolic resin on the particle undergoes sufficiently rapid cross-linking.

A distinctive feature of the present invention is the provision of relatively low-alkaline center-layer phenolic resins (2 to 8% of alkali) to which, prior to processing, alkali is added in sufficient quantities, when preparing the glue mixture, in order to attain a total alkali content of 7 to 13%, preferably 8 to 12%, whereby sufficiently rapid curing of the phenolic resin is ensured. As a result of the heat of reaction generated by the addition of alkali the glue mixture is heated up to 20° C., depending on the alkali quantity added, and, thus, the viscosity of the glue mixture is advantageously reduced so that the glue can better be spread over the particles and improved strengths are attained.

Furthermore, the high reactivity of the low-alkaline resins is preserved by subsequent addition of alkaline solution because due to the low temperature and the short time of action formation of formate and methanol is largely prevented.

Another advantage of this process variant is that, contrary to urea-modified, high-alkaline resins, no ammonia is released.

In addition, the user, i.e. the particleboard manufacturer, is free to adjust the NaOH quantity to the acidity of the wood particles in order to ensure quality-consistent swelling characteristics of the particleboard.

Like the phenolic resins normally used these days, the center-layer resins according to the present invention may be processed along with hardeners etc. into glue mixtures which are subsequently applied to the center-layer particles.

The following examples illustrate production and application of the resins according to the present invention. The superiority of the novel, fast-curing center-layer phenolic resins with respect to shorter pressing times is documented by the following examples.

The viscosities were measured at 20° C.

The solids content was determined on 1 gram of substance dried at 120° C. for two hours in a recirculating-air oven.

EXAMPLE 1 (According to the Instant Invention)

941 parts by weight of phenol (10 moles) and 232 parts by weight of 50% sodium hydroxide solution were placed into a flask and heated to 90° C. To this mixture there were added within 80 minutes, 1,950 parts by weight of 40% formalin (26 moles) followed by addition of 232 parts by weight of 50% sodium hydroxide solution over a period of 15 minutes. The mixture was condensed at 85° C. for 30 minutes. The temperature then was lowered to 65° C. within 60 minutes. Once the viscosity reached 90,000 mPa·s at 20° C. (formaldehyde content 4.2%), 1,357 parts by weight of urea were added (40.7%, referring to phenolic resin solution).

The resin thus obtained had the following characteristics:

| Solids content | % | 58.9 |
| Viscosity at 20° C. | mPa · s | 620 |
| Gel time at 100° C. | min | 14 |
| Alkali content (theoretical, as NaOH) | % | 4.9 |
| Formaldehyde content | % | 0.3 |

To this resin, there were added before processing 11 parts by weight of 50% sodium hydroxide solution, referring to 100 parts by weight of resin solution, resulting in a total alkali content of 9.4 wt. % (calculated as NaOH). During the addition, the temperature of the glue mixture increased from 20° C. to 33° C. at which temperature the viscosity decreased to 320 mPa·s.

EXAMPLE 2 (Comparative Example)

A conventional center-layer phenolic resin available on the market was used for this experiment.

505 parts by weight of phenol (5,37 moles) and 218 parts by weight of 50% sodium hydroxide solution were placed into a flask and heated to 80° C. To this mixture, 1,104 parts by weight of 38% formalin (14 moles) were added over a one-hour period without changing the temperature. Once the viscosity reached 900 mPa·s, the temperature was lowered to 70° C. At 1,700 mPa·s, 169 parts by weight of 50% sodium hydroxide solution were added followed by cooling of the batch.

The resin thus obtained had the following characteristics:

| Solids content | % | 48.1 |
| Viscosity at 20° C. | mPa · s | 750 |
| Gel time at 100° C. | min | 30 |
| Formaldehyde content | % | 0.3 |
| Alkali content (theoretical, as NaOH) | % | 9.7 |

EXAMPLE 3 (Comparative Example)

This example corresponds to the process described in EP 84 115 270.5.

941 parts by weight of phenol (10 moles) and 236 parts by weight of 50% sodium hydroxide solution were placed into a flask and heated to 90° C. To this mixture, 1,960 parts by weight of 40% formalin (26 moles) were added within 80 minutes without changing the temperature followed by addition of 212 parts by weight of 50% sodium hydroxide solution. The mixture was condensed and once the viscosity reached 1,320 mPa·s, 440 parts by weight of 50% NaOH were added within 15 minutes. At a viscosity of 7,200 mPa·s at 20° C. (formaldehyde content 0.6%) the reaction was stopped by addition of 940 parts by weight of urea (24.8%, referring to phenolic resin solution).

The resin had the following characteristics:

| Solids content | % | 53.5 |
| Viscosity at 20° C. | mPa · s | 690 |
| Gel time at 100° C. | min | 31 |
| Formaldehyde content | % | 0.3 |
| Alkali content (theoretical, as NaOH) | % | 9.4 |

EXAMPLE 4 (Comparative Example)

This experiment corresponding to that described in Example 1 illustrates the effect of premature addition of caustic solution.

941 parts by weight of phenol (10 moles) and 232 parts by weight of 50% sodium hydroxide solution were placed into a flask and heated to 90° C. To this mixture, 1,950 parts by weight of 40% formalin (26 moles) were added within 80 minutes without changing the temperature followed by addition of 232 parts by weight of 50% sodium hydroxide solution within 15 minutes. The mixture was condensed for 20 minutes at 85° C. 518 parts by weight of 50% sodium hydroxide solution then were added within 15 minutes. Once the viscosity reached 900 mPa·s, the temperature was lowered to 70° C. At 5,900 mPa·s at 20° C. (formaldehyde content 0.8%) 1,357 parts by weight of urea were added (35.0%, referring to phenolic resin solution).

The resin thus obtained had the following characteristics:

| Solids content | % | 56.6 |
| Viscosity at 20° C. | mPa · s | 630 |
| Gel time at 100° C. | min | 34 |
| Formaldehyde content | % | 0.4 |
| Alkali content (theoretical, as NaOH) | % | 9.4 |

As early as after a one-day storage at room temperature the resin gave off a strong smell of ammonia.

Use of the Center-Layer Resins According to the Instant Invention for the Manufacture of Particleboard The qualities of the modified, highly reactive phenolic resins according to the invention were tested in triple-layer particleboard having a thickness of 19 mm and an outer-layer/center-layer particle ratio of 35:65. The glue application to the outer-layer particles was 8% of solid resin, whereas the center-layer particles were glued with 7% of solid resin, referring to absolutely dry particles.

In order to accelerate curing, 8 wt. % of 50% potassium carbonate solution, referring to resin solution, were added to the center-layer resins.

The particles were made water-repellent by addition of 1% of paraffin (as 50 wt. % paraffin emulsion), referring to absolutely dry particles, to the phenolic resins.

The outer-layer particles were glued with a commercially available, modified 45% phenolic resin such as the resin described in EP 84 115 270.5.

Comparative Evaluation of the Particleboard Characteristics

| Example | | according to the instant invention 1 | Comparative Examples 2 | 3 | 4 |
|---|---|---|---|---|---|
| Pressing factor | min/mm | 0.105 | 0.150 | 0.140 | 0.125 |
| Flexural strength | N/mm$^2$ | 18.8 | 18.2 | 18.4 | 18.4 |
| Tensile strength (perpendicular)(V 20) | N/mm$^2$ | 0.47 | 0.45 | 0.43 | 0.41 |
| Tensile strength (perpendicular)(V 100) | N/mm$^2$ | 0.17 | 0.16 | 0.16 | 0.16 |

All tests were carried out in accordance with DIN 68 763.

The table clearly shows that the resin according to the invention as described in Example 1 results in strengths that are comparable to those attained with conventional resins as outlined in Comparative Examples 2, 3 and 4 but that significantly shorter pressing times are required when using said resin.

We claim:

1. A process for producing urea-modified, highly reactive phenolic resins useful as bonding agents for center-layer particles in the manufacture of particleboard, comprising condensing phenol and formaldehyde under alkaline conditions, adding 30 to 50 wt. % of urea, based on the phenol-formaldehyde condensation product, obtaining urea-modified phenolic resins which contain 50 to 70% solids, 2 to 8 wt. % of alkali (calculated as NaOH) and which have viscosities of 5,000 mPa·s at 20° C. or less, and shortly before use as a bonding agent for center-layer particles in the manufacture of particleboard, adding a sufficient amount of an alkaline solution to said urea-modified phenolic resins in order to ensure a total alkali content of 7 to 13 wt. % (calculated as NaOH) in the resins, where the pressing time is reduced as compared with a process where said alkaline solution is not added prior to said use as a bonding agent.

2. The process of claim 1, characterised in that, prior to the adding of urea, the condensing of phenol and formaldehyde under alkaline conditions is carried on until a viscosity of at least 3,000 mPa·s at 20° C. is reached.

3. The process of claim 2, characterised in that the condensing of phenol and formaldehyde under alkaline conditions is carried on until a viscosity of 5,000 to 300,000 mPa·s at 20° C. is reached.

4. The process of claim 1, characterised in that, after the adding of urea, the urea-modified phenolic resins obtained therefrom contain 55 to 65% solids.

5. The process of claim 1, characterised in that, after the adding of urea and before the manufacture of particleboard, the urea-modified phenolic resins obtained therefrom contain 4 to 7 wt. % of alkali.

6. The process of claim 1, characterised in that, after the adding of urea and before the manufacture of particleboard, the urea-modified phenolic resins obtained therefrom have viscosities of from 100 to 1,500 mPa·s at 20° C.

7. The process of claim 6, characterised in that, after the adding of urea, the urea-modified phenolic resins obtained therefrom have viscosities of from 200 to 1,000 mPa·s at 20° C.

8. The process of claim 1, characterised in that, prior to manufacture of particleboard, a sufficient amount of alkaline solution is added to the urea-modified phenolic resins in order to attain a total alkali content of 8 to 12 wt. % (calculated as NaOH) in the resins.

9. A process for producing urea-modified, highly reactive phenolic resins useful as bonding agents for center-layer particles in the manufacture of particleboard, comprising condensing phenol and formaldehyde under alkaline conditions until a viscosity of at least 3,000 mPa·s at 20° C. is reached, adding 30 to 50 wt. % of urea, based on the phenol-formaldehyde condensation product, obtaining urea-modified phenolic resins which contain 55 to 65% solids, 4 to 7 wt. % of alkali (calculated as NaOH) and which have viscosities of 5,000 mPa·s or less at 20° C., and shortly before use as a bonding agent for center-layer particles in the manufacture of particleboard, adding a sufficient amount of an alkaline solution to said urea-modified phenolic resins in order to ensure a total alkali content of 7 to 13 wt. % (calculated as NaOH) in the resins, where the pressing time is reduced as compared with a process where said alkaline solution is not added prior to said use as a bonding agent.

10. A process for producing urea-modified, highly reactive phenolic resins useful as bonding agents for center-layer particles in the manufacture of particleboard, comprising condensing phenol and formaldehyde under alkaline conditions until a viscosity of between 5,000 to 300,000 mPa·s at 20° C. is reached, adding 30 to 50 wt. % of urea, based on the phenol-formaldehyde condensation product, obtaining urea-modified phenolic resins which contain 55 to 65% solids, 4 to 7 wt. % of alkali (calculated as NaOH) and which have viscosities of between 100 to 1,500 mPa·s at 20° C., and shortly before use as a bonding agent for center-layer particles in the manufacture of particleboard, adding a sufficient amount of an alkaline solution to said urea-modified phenolic resins in order to ensure a total alkali content of 8 to 12 wt. % (calculated as NaOH) in the resins, where the pressing time is reduced as compared with a process where said alkaline solution is not added prior to said use as a bonding agent.

* * * * *